US006301762B1

(12) United States Patent
Jenkins

(10) Patent No.: US 6,301,762 B1
(45) Date of Patent: Oct. 16, 2001

(54) METHOD OF MOUNTING AND REMOVING QUICK SLIP DIE PLATE

(75) Inventor: Paul Michael Jenkins, Hendersonville, TN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/642,673

(22) Filed: Aug. 22, 2000

Related U.S. Application Data

(62) Division of application No. 09/209,722, filed on Dec. 11, 1998, now Pat. No. 6,224,672.

(51) Int. Cl.[7] .......... B23D 6/00

(52) U.S. Cl. .......... 29/402.03; 29/426.1; 411/84; 411/104

(58) Field of Search .......... 29/402.03, 426.1; 411/84, 104, 539; 118/410, 302

(56) References Cited

U.S. PATENT DOCUMENTS 2,907,419 * 10/1959 Klank, Jr. .
5,389,151 2/1995 Fort .
5,478,224 12/1995 McGuffey .
5,622,315 4/1997 Keane et al. .
5,642,641 * 7/1997 Maxfield, Jr. et al. .......... 72/358
5,683,037 11/1997 Rochman et al. .
5,740,963 4/1998 Riney et al. .

* cited by examiner

*Primary Examiner*—S. Thomas Hughes
*Assistant Examiner*—John C. Hong
(74) *Attorney, Agent, or Firm*—Schwartz & Weinrieb

(57) ABSTRACT

A plate member, which may be a die plate or a shim, which is adapted to be used within a fluid material dispensing system, such as, for example, a system for dispensing or distributing adhesives upon substrates, is provided with a plurality of apertures equally spaced along the longitudinal extent thereof. The apertures comprise a plurality of through-bores for respectively receiving a plurality of fasteners, which are adapted to secure the plate member to a support structure, for example, an adhesive manifold or the like. In addition to the through-bores, milled slots are also provided within the plate member, the milled slots connecting the through-bores to a free edge portion of the plate member. In this manner, when the plate member is to be removed from the support structure so as to be replace with a new or different plate member, the fasteners need only be untightened, but not removed from the support structure, the plate member can be slidably removed from the support structure, a new plate member can be slidably mounted upon the support structure, and the fasteners are then re-tightened. The process of simply untightening the fasteners but not having to completely remove the same from the support structure, and then re-tightening the fasteners, saves considerable operating time and eliminates tedious work for operator personnel.

14 Claims, 3 Drawing Sheets

METHOD OF MOUNTING AND REMOVING QUICK SLIP DIE PLATE

This patent application is a Divisional patent application of prior U.S. patent application Ser. No. 09/209,722, which was filed on Dec. 11, 1998, now U.S. Pat. No. 6,224,672.

FIELD OF THE INVENTION

The present invention relates generally to viscous material dispensing systems or apparatus, such as, for example, systems or apparatus for dispensing and distributing adhesive or resin materials, and more particularly to a die plate which is adapted to be incorporated within the system or apparatus wherein the die plate is provided with structural means which permits the die plate to be rapidly and easily mounted upon and removed from, for example, the operatively associated glue block or adhesive manifold.

BACKGROUND OF THE INVENTION

Various viscous material dispensing systems or apparatus, such as, for example, systems or apparatus for dispensing and distributing adhesive or resin materials, whereby the adhesive or resin materials can be applied to or deposited upon a particular substrate, are of course well known. One such known system or apparatus is disclosed within U.S. Pat. No. 5,622,315 which was issued on Apr. 22, 1997 to the inventors Keane et al. As shown in FIG. 6 of the patent, the system or apparatus comprises an upper die half 12, a lower die half 14, a mouthpiece or die plate 22, and a shim 16 which is interposed between and separates the upper and lower die halves 12,14 so as to define a die opening 20 therebetween. The mouthpiece or die plate 22 is secured to the upper die half 12 by means of a plurality of threaded screws 124.

Another material dispensing system or apparatus for likewise dispensing and distributing materials of the aforenoted type for deposition upon a substrate is disclosed within U.S. Pat. No. 5,478,224 which was issued on Dec. 26, 1995 to the inventor McGuffey, such patent being assigned to the assignee of the present invention. As best appreciated from FIGS. 2 and 3 of the patent, the system or apparatus similarly comprises a glue block or adhesive manifold 66, a mouthpiece or die plate 86, and a shim 88 interposed between the bottom surface of the glue block or adhesive manifold 66 and the mouthpiece or die plate 86. A plurality of fasteners, illustrated but not numbered, fixedly secure the mouthpiece or die plate 86, and the shim 88, upon the underside of the glue block or adhesive manifold 66.

FIG. 1 is also illustrative of a conventionally known die plate generally indicated by the reference character 10. As is known, the die plate 10 comprises a plurality of laterally spaced material or fluid deposition channels 12, into which, for example, the viscous fluid or material is initially charged or deposited, and a laterally extending distribution channel 14 which fluidically interconnects the plurality of fluid deposition channels 12. A doctor blade or material application surface 16 is formed upon a leading edge portion of the die plate 10, and a recessed lip region 18 is defined within the leading edge portion of the die plate 10 so as to permit defined or precisely controlled fluidic communication between the laterally extending distribution channel 14 and the doctor blade or material application surface 16. A plurality of through bores 20 are defined within the die plate 10 so as to permit the die plate 10 to be fixedly secured to a glue block, adhesive manifold, or the like, by means of suitable threaded bolt fasteners, or the like, not shown.

FIG. 2 illustrates another conventionally known die plate which is similar to the die plate 10 of FIG. 1 and is generally indicated by the reference character 110. In view of the similarity of the die plate 110 of FIG. 2 to the die plate 10 of FIG. 1, like or corresponding parts of the die plate 110 have been designated by similar reference characters, within the 100 series, however, further detailed description of the same has been omitted herefrom in view of the fact that one of ordinary skill in the art will readily appreciate the various similar operative components or elements of the die plate 110.

In view of the threaded bolt fastening of the various die plates, or the like, to the associated support structures as disclosed within the patents of Keane et al. and McGuffey, as well as the die plates 10 and 110 illustrated in FIGS. 1 and 2, and in particular, as illustrated in FIGS. 2B and 3 of Keane et al. and McGuffey, respectively, it is readily appreciated that the number of bolt fasteners 124, for example, as shown in Keane et al., as well as those not numbered in McGuffey, which are used to fasten the die plates or the like to their support structures, is considerable. Accordingly, when a particular die plate is to be exchanged or replaced so as to, for example, alter the adhesive patterns or replace a worn die, the exchange or replacement operation is quite time-consuming and labor intensive in view of the considerable number of bolt fasteners which are required to be completely removed from the support structure in connection with the removal of the particular or original die plate, and subsequently, the replacement or reinsertion of such bolt fasteners back into the support structure in order to secure the newly exchanged or replacement die plate upon the support structure.

FIGS. 3 and 4 illustrate another conventional die plate assembly system or apparatus, manufactured by the NORDSON CORPORATION, which was designed to overcome the operative drawbacks characteristic of the die plates illustrated within FIGS. 1 and 2, as well as those illustrated within the foregoing patents to Keane et al. and McGuffey. More particularly, with reference initially being made to FIG. 3, such apparatus or system 210 is seen to comprise a head 212 within which is mounted a cartridge heater 214. An adhesive manifold 216, through which a supply of adhesive 218 is conveyed, is mounted upon the head 212, and a doctor blade assembly 220, which is shown enlarged in FIG. 4, is adapted to be mounted upon the head 212. As shown in FIG. 4, the doctor blade assembly 220 comprises a pair of doctor blades 222,224 between which is mounted a shim 226, the doctor blades 222,224 being fixedly secured together by means of a threaded fastener 228. In order to mount the doctor blade assembly 220 upon the head 212, a substantially C-shaped clamp 230 is bolted to head 212 by means of one or more bolt fasteners 232. Consequently, as may be appreciated from FIG. 3, the doctor blade assembly 220 is clamped between a lower leg portion 234 of the C-clamp 230 and a lower dependent portion 236 of the head 212. Accordingly, when it is desired to remove or exchange the die in order to change the adhesive patterns or replace a worn die, the one or more bolt fasteners 232 are simply loosened, but not removed, and the doctor blade assembly 220 is thereby permitted to be readily, simply, and quickly removed, and a new doctor blade assembly 220 is likewise able to be readily, simply, and quickly inserted. Bolt fasteners 232 are then re-tightened and the system or apparatus is back on line.

While the aforenoted NORDSON system thus overcomes the operative drawbacks characteristic of the prior art of Keane et al. and McGuffey, as well as the die plates 10 and

110 shown in FIGS. 1 and 2, in that the doctor blade assembly can be easily and rapidly exchanged or replaced without operator personnel having to perform the aforenoted time-consuming and tedious operations of completely removing the bolt fasteners mounting the die plates upon the support structure, the NORDSON system or apparatus exhibits its own operative drawbacks and has therefore not proven to be entirely satisfactory. For example, in view of the fact that the doctor blade assembly 220 is clamped between the C-clamp 230 and the head 212, as opposed to being bolted upon the head 212, the doctor blade assembly 220 may not be precisely positioned or oriented upon the head 212 whereby the resulting adhesive patterns, to be applied to a particular substrate, may not be achieved. In addition, if the doctor blade assembly 220 is not precisely or properly positioned or oriented upon the head 212, the conveyed adhesive 218 will, for example, become interposed, or penetrate the surface interface defined, between the doctor blade assembly 220 and the lower end or dependent portion 236 of the head 212 whereby, again, proper dispensing, application, or distribution of the adhesive onto or upon the substrate will be adversely affected.

Accordingly, there is a need in the art for a new and improved die plate or shim element or component whereby all of the aforenoted drawbacks and disadvantages characteristic of the prior art die plate or shim assemblies can be overcome or rectified.

OBJECTS OF THE INVENTION

Accordingly, it is an object of the present invention to provide a new and improved die plate or shim element or component and a method of mounting the same upon associated support structure of fluid medium dispensing apparatus.

Another object of the present invention is to provide a new and improved die plate or shim element or component which enables the same to be precisely, yet adjustably, positioned upon the support structure of the fluid medium dispensing apparatus.

A further object of the present invention is to provide a new and improved die plate or shim element or component which enables the same to be quickly and easily mounted upon or removed from the support structure of the fluid medium dispensing apparatus.

SUMMARY OF THE INVENTION

The foregoing and other objects are achieved in accordance with the teachings of the present invention through the provision of a new and improved die plate or shim element or component wherein the die plate or shim element or component comprises an elongated member having a longitudinal extent. A plurality of through-bores are provided within the die plate or shim element or component so as to be substantially equally spaced along the longitudinal extent thereof and within or through which fastener shank portions can extend so as to facilitate the mounting of the die plate or shim element or component upon a suitable support or mounting surface of the fluid medium dispensing apparatus.

In accordance with the particularly new and novel features of the present invention, milled slots are formed within the die plate or shim so as to extend inwardly, in directions perpendicular to the longitudinal extent of the die plate or shim, from the free edge of the die plate or shim which is oppositely disposed with respect to the doctor blade or fluid medium application surface, so as to mate with or intersect the through-bores which are conventionally provided within the die plate or shim. In this manner, when, for example, the die plate or shim is to be removed from the support or mounting surface of the fluid medium dispensing apparatus, the threaded bolt or screw fasteners need only be loosened, and not removed, whereby the die plate or shim can simply be slidably removed from the support or mounting surface as a result of the fastener shank portions being, in effect, slid through the milled slots of the die plate or shim. In a similar manner, a new die plate or shim can be mounted upon the support or mounting surface of the dispensing apparatus by aligning the milled slots of the new die plate or shim with the fastener shank portions of the fasteners still threadedly engaged within the support or mounting surface of the fluid medium dispensing apparatus and then sliding the die plate or shim onto the support or mounting surface of the fluid medium dispensing apparatus such that the shank portions of the threaded fasteners enter the milled slots of the die plate or shim. Once the new die plate or shim is properly positioned upon the support or mounting surface of the dispensing apparatus as a result of the fastener shank portions being, in effect, seated or coaxially aligned with the through-bores of the die plate or shim, the threaded fasteners are re-tightened so as to fixedly secure the die plate or shim upon the support or mounting surface of the dispensing apparatus.

In accordance with a further feature of the present invention die plate or shim, the through-bores of the shim or die plate have unconventional oval-shaped cross-sectional configurations such that together with the milled slots, the combined slot-bore structure has a substantially key-hole shaped configuration. Such structure permits the die plate or shim to experience movement with two degrees of freedom, in opposite lateral directions aligned with the longitudinal extent of the die plate or shim, with respect to the threaded fasteners such that positional adjustment of, for example, the die plate can be achieved in order to slightly alter the precise positions at which the fluid medium is being discharged, dispensed, or deposited. Alternatively, or additionally, the provision of such degrees of freedom of movement of the die plate or shim facilitates the mounting or positional adjustment of the die plate or shim upon the support surface of the dispensing apparatus when, for example, the die plate or shim may exhibit dimensional inconsistencies, or may experience different growth rates, relative to the heated head or manifold of the dispensing apparatus, due to being fabricated from materials which are different from those of the head or manifold wherein such materials exhibit or are characterized by different coefficients of expansion.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
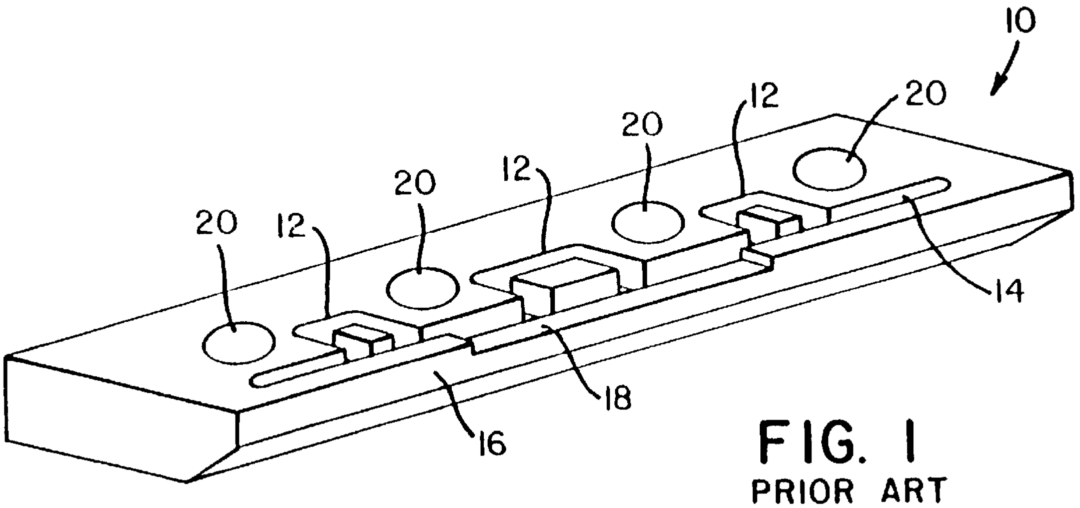
FIG. 1 PRIOR ART
FIG. 1 is a perspective view of a first PRIOR ART fluid medium dispensing die plate.
Figure 2:
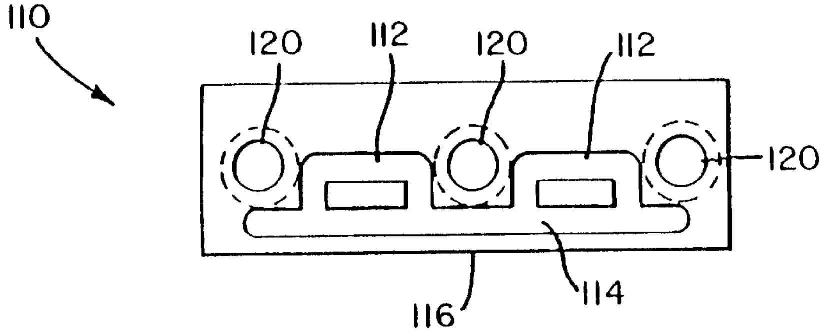
FIG. 2 PRIOR ART
FIG. 2 is a top plan view of a second PRIOR ART fluid medium dispensing die plate.
Figure 3:
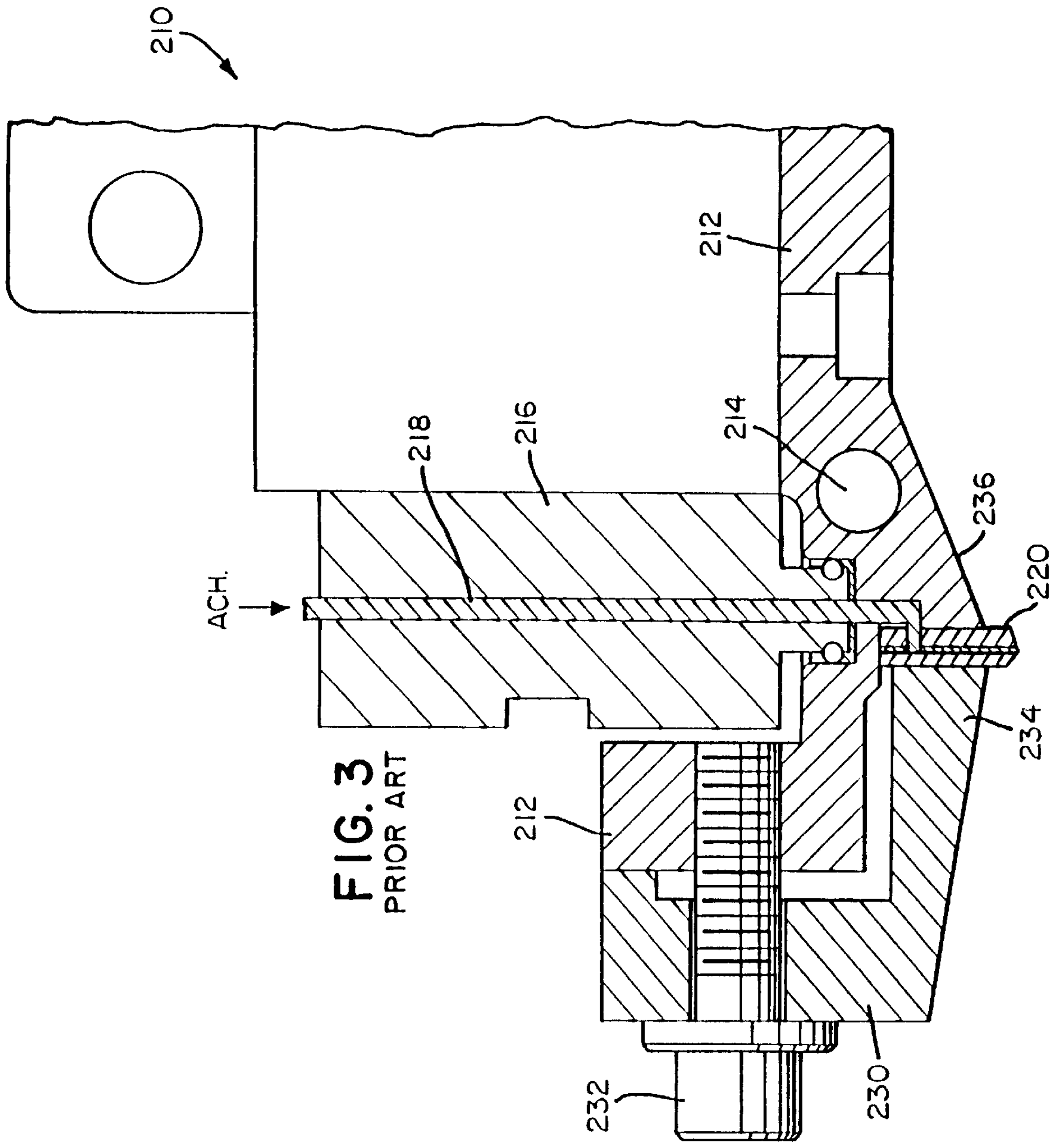
FIG. 3 PRIOR ART
FIG. 3 is cross-sectional view of a PRIOR ART fluid medium dispensing apparatus having a doctor blade assembly clampingly mounted thereon.
Figure 4:
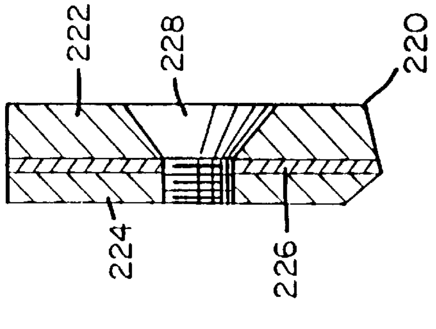
FIG. 4 PRIOR ART
FIG. 4 is a cross-sectional view of the doctor blade assembly clamped upon the apparatus of FIG. 3.
Figure 5:
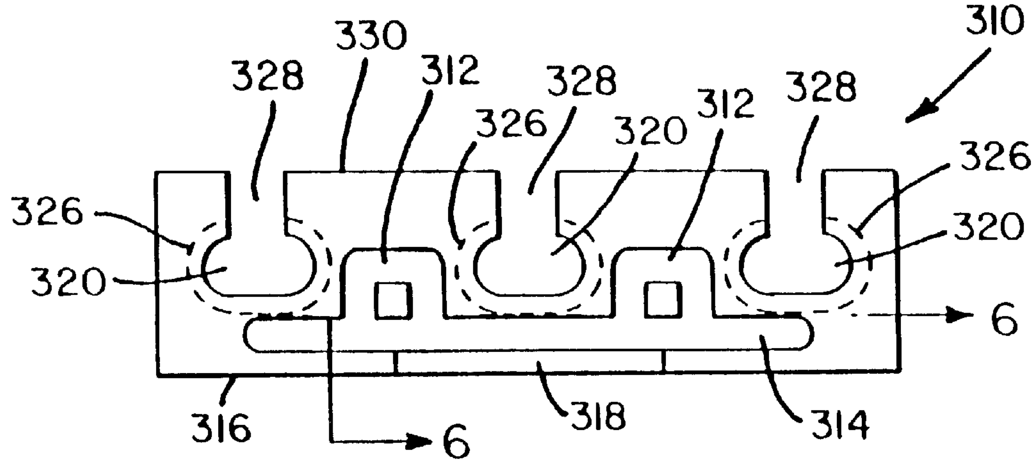
FIG. 5 is a top plan view, similar to that of FIG. 2, showing however the new and improved die plate constructed in accordance with the teachings and principles of the present invention and showing the cooperative parts thereof.
Figure 6:
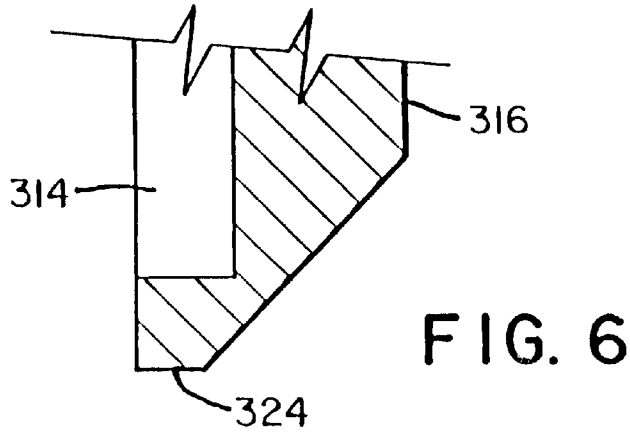
FIG. 6 is a partial cross-sectional view of the die plate of FIG. 5 as taken along the lines 6—6 of FIG. 5.

While the detailed description of the present invention will in effect be directed toward and fully describe a new and improved die plate element or component which may be mounted upon and used within fluid dispensing apparatus as is known in the art, it is to be initially noted that the principles and teachings of the present invention are not to be limited in their application to such die plates or components, but are also applicable to shim elements which are often used within such apparatus to define predetermined spaces through which, for example, the fluid being dispensed can be conducted or conveyed. Referring then to the drawings, and more particularly to FIG. 5 thereof, the new and improved die plate element or component constructed in accordance with the teachings and principles of the present invention is illustrated and generally indicated by the reference character 310. Parts of the die plate 310 which are similar to those of the die plates 10 and 110 of FIGS. 1 and 2, respectively, will be designated by similar reference characters except that the reference characters will be in the 300 series. Accordingly, the die plate 310 is seen to comprise a plurality of fluid deposition channels 312, and a laterally extending distribution channel 314 which fluidically interconnects the fluid deposition channels 312. A doctor blade or material application surface 316 is formed upon a leading edge portion of the die plate 310, and a recessed lip region 318 is defined within the leading edge portion of the die plate 310 so as to permit defined or precisely controlled fluidic communication between the laterally extending fluid material distribution channel 314 and the doctor blade or material application surface 316.

In accordance with the particularly new and novel teachings and principles of the present invention, it is seen that the die plate 310 is further provided with a plurality of through-bores 320, and the undersurface 324 of the die plate 310 has counterbored portions 326 defined therein and disposed around the through-bores 320 so as to accommodate the head portions of the screw or threaded bolt fasteners, not shown, which are used to fixedly mount the die plate 310 upon a suitable support surface of the dispensing apparatus, the shank portions of the fasteners being substantially coaxially aligned with the axes of the through-bores 320 which extend into the drawing page. In addition, the die plate 310 is further provided with a plurality of milled slots 328 which are formed within the die plate 310 so as to extend inwardly from the trailing edge portion 330 of the die plate 310, which is disposed opposite the leading edge portion 316 of the die plate 310 which defines the doctor blade or fluid material application surface, in directions which are substantially perpendicular to the longitudinal extent of the die plate 310 as defined by the leading and trailing edge portions 316,330 of the die plate 310.

Each one of the milled slots 328 intersects a respective one of the through-bores 320, and consequently, in accordance with the foregoing structure characteristic of the die plate 310 of the present invention, when a die plate 310 is desired to be removed from the dispensing apparatus so as to be exchanged by or replaced with a new, or another, die plate 310, the screw or threaded bolt fasteners, not shown, which are disposed within the through-bores 320 and threadedly engaged within the support structure, for example, the adhesive manifold, also not shown, to which the die plate 310 is fixedly secured, are loosened to a degree which is not only sufficient to permit the die plate 310 to now be readily moved relative to, for example, the support structure, that is, the adhesive manifold, but in addition, to permit the heads of the fasteners to be disengaged from the counterbored head seat portions 326 of the die plate 310. This enabling of movement of the die plate 310 relative to the support structure effectively permits the die plate 310 to be readily and simply removed from the support structure or adhesive manifold.

More particularly, the shanks of the fasteners, which were originally positioned within the through-bores 320 of the die plate 310 such that the axes of the fasteners were substantially coaxially aligned with the axes of the through-bores 320 when the die plate 310 was fixedly secured upon the adhesive manifold, are now moved relative to the die plate 310 whereby the fastener shanks move transversely with respect to the longitudinal extent of the die plate 310 and through the milled slots 328 whereby the die plate 310 is now entirely disengaged from the fasteners and is able to be fully removed from the adhesive manifold support structure. In a similar manner, a new die plate 310 is able to be mounted upon the adhesive manifold support structure. In particular, the adhesive manifold support structure will at this point have a plurality of threaded fasteners in effect projecting outwardly from the support surface thereof such that the the head portions of the fasteners are spaced from the support surface upon which the die plate 310 is to be mounted, supported, and fixed. Consequently, the new die plate 310 is simply and readily mounted upon the adhesive manifold by aligning the transversely oriented milled slots 328 of the die plate 310 with the fastener shanks and head portions projecting outwardly or away from the adhesive manifold support surface, moving the new die plate 310 transversely with respect to the adhesive manifold fasteners such that the projecting fastener shank portions in effect move through the milled slots 328 of the die plate 310 and toward the through-bores 320 of the die plate 310, and when the fastener shank portions are substantially coaxially aligned with the through-bores 320, the threaded fasteners are re-tightened until the head portions thereof are fully seated within the counterbored portions 326 of the die plate 310.

From the foregoing, it can therefore be readily appreciated that the process attendant the exchange or replacement of a particular die plate 310 for another or a new die plate 310 has been remarkably simplified while simultaneously effectively eliminating time-consuming and tedious operations heretofore required to be performed by suitable operator personnel. In particular, the die plate exchange or replacement operations which heretofore required operator personnel to completely remove all of the threaded fasteners from the support structure, upon which the die plate was mounted, in order to be able to remove an existing die plate and exchange or replace the same with a new die plate have been effectively eliminated, and the new operations or procedures are drastically more simplified and less time-consuming and tedious in view of the fact that the threaded fasteners now only need to be loosened and not entirely removed. When the number of fasteners, normally required or employed to secure a die plate upon its support structure, as previously noted as being illustrated in the Keane et al. and McGuffey patents, is considered or appreciated, the savings in operation downtime attendant a die plate exchange or replacement operation, is substantial.

Another new and novel feature characteristic of the die plate 310 of the present invention is the provision of the through-bores 320 within the die plate 310 such that the cross-sectional configuration of the through-bores 320 is effectively that of an oval or ellipse. In this manner, there is provided a predetermined amount of "play" defined between the opposite side walls of the through-bores 320 and the shank portions of the threaded fasteners such that the die plate 310 is permitted to experience movement, relative to the fasteners and substantially along the longitudinal extent of the die plate, with two degrees of freedom. This structural feature or arrangement serves two operational purposes. Firstly, in connection with the deposition or discharge of, for example, adhesive or other resin material, from the die plate 310 onto a particular structure, it is sometimes desired to slightly alter the precise position or location at which the adhesive or resin material is applied to or deposited upon the substrate. For example, in connection with the deposition of adhesive onto a substrate which may comprise a packaging carton flap, the precise position or location of the adhesive, as the same is discharge onto or deposited upon an edge portion of the carton flap, is desired to be altered or adjusted so as to enhance the sealing integrity of the adhesive seal being provided upon the carton flap closure arrangement or system. With the die plate 310 of the present invention, such slight positional adjustments are readily facilitated.

A second purpose served by the provision of the oval-shaped through-bores 320 within the die plate 310 is to accommodate any dimensional inconsistencies between the location of the through-bores 320 within the die plate 310 and the disposition of the threaded fasteners upon the apparatus support surface or structure. These dimensional inconsistences may be the result of inaccurate original manufacturing or fabrication tolerances, or they may be the result of differential material growth or expansion characteristics of the die plate 310 and the support structure, that is, for example, a heated adhesive manifold, wherein such components may be fabricated from different materials which exhibit different coefficients of expansion. The adhesive manifold may already, at a particular point in time of the overall adhesive deposition process, be heated to an elevated degree whereupon the same having experienced a predetermined amount of expansion, the distances between centerlines or axes of adjacent fasteners may be altered from their relative disposition under cold conditions. A new die plate, being relatively cold, may not be thermally expanded to the same degree as that of the manifold. Consequently, the removal and/or mounting of the die plates from or upon the manifold may otherwise present procedural difficulties.

In either case wherein such dimensional disparities may occur or be present between the die plate 310 and the underlying support structure comprising the adhesive manifold, or wherein positional adjustments of the die plate 310 with respect to the underlying adhesive manifold support structure are to be made in accordance with particularly desired deposition parameters, the die plate 310 of the present invention can accommodate such inconsistencies whereby some of the fasteners, in effect, will not be truly coaxially aligned with particular ones of the through-bores 320 of the die plate 310, however, the die plate 310 can nevertheless be properly mounted upon and secured to the underlying support structure comprising, for example, an adhesive manifold, whereby proper operation of the apparatus in connection with the discharge or deposition of an adhesive material may still be achieved.

Obviously, many modifications and variations of the present invention are possible in light of the above teachings. For example, as has been noted heretofore, while this patent specification has exemplified the principles of the present invention with respect to a fluid medium die plate, the same principles are equally applicable to a shim which is also utilized within the same environment as illustrated within the aforenoted Keane et al. and McGuffey patents. It is therefore to be understood that within the scope of the appended claims, the present invention may be practiced otherwise than as specifically described herein.

What is claimed as new and desired to be protected by Letters Patent of the United States of America, is:

1. A method of replacing plate members, used in connection with a system for applying a fluid material onto a substrate, wherein each plate member is fixedly mounted upon a support structure by a plurality of fasteners engaged with the support structure, comprising the steps of:

providing a support structure with a plurality of apertures which are respectively adapted to receive a plurality of securing fasteners therein;

fixedly mounting a first plate member, having a plurality of apertures defined therein, upon the support structure by inserting shank portions of a plurality of securing fasteners through said plurality of apertures defined within said first plate member, engaging the plurality of securing fasteners within the plurality of apertures defined within the support structure, and tightening the plurality of securing fasteners engaged within the plurality of apertures defined within the support structure so as to fixedly secure said first plate member upon the support structure;

untightening the plurality of securing fasteners with respect to the support structure but maintaining the shank portions of the plurality of securing fasteners disposed within the plurality of apertures defined within the support structure;

slidably moving said first plate member with respect to the shank portions of the plurality of securing fasteners, while maintaining the shank portions of the plurality of securing fasteners disposed within the plurality of apertures defined within the support structure, so as to remove said first plate member from the support structure as a result of the shank portions of the plurality of securing fasteners passing through and being disengaged from said apertures defined within said first plate member;

slidably mounting a second plate member, having a plurality of apertures defined therein, upon said support structure by relatively moving the shank portions of the securing fasteners through said apertures defined within said second plate member while the plurality of securing fasteners are still disposed within the apertures defined within the support structure; and re-tightening the plurality of fasteners with respect to the support structure so as to fixedly secure said second plate member upon the support structure.

2. The method as set forth in claim 1, further comprising the step of:

forming said plate member as a die plate.

3. A method as set forth in claim 2, further comprising the steps of:

providing said die plate with a fluid material application surface for applying a fluid material onto the substrate; and providing channel means within said die plate for conducting the fluid material from a supply of fluid material toward said fluid material application surface.

4. The method as set forth in claim 1, further comprising the step of:

forming said plate member as a shim.

5. The method as set forth in claim 1, wherein said apertures defined within said plate member are formed by the steps of:

forming a plurality of through-bores within substantially central portions of said plate member along a longitudinal axis thereof; and forming a plurality of milled slots within said plate member such that said milled slots interconnect said plurality of through-bores with a free edge portion of said plate member.

6. The method as set forth in claim 5, further comprising the step of:

providing said through-bores of said plate member with substantially oval configurations such that said plate member can be adjustably positioned with respect to the plurality of shank portions of the securing fasteners in two degrees of freedom comprising lateral movements of said plate member in either one of two opposite directions.

7. The method as set forth in claim 5, further comprising the step of:

forming each one of said through-bores within said plate member with a counterbored portion for accommodating a head portion of each one of the plurality of securing fasteners when the plurality of fasteners are tightly engaged within the support structure.

8. A method of replacing plate members, used in connection with a system for depositing a fluid material onto a substrate, wherein each plate member is fixedly mounted upon a support structure by a plurality of fasteners engaged with the support structure, comprising the steps of:

providing a support structure with a plurality of apertures;

partially inserting a plurality of securing fasteners within the plurality of apertures defined within the support structure such that the plurality of securing fasteners are disposed in partially tightened states with respect to the support structure;

fixedly mounting a first plate member, having a plurality of apertures formed therein, upon the support structure by inserting shank portions of the plurality of securing fasteners through said plurality of apertures defined within said first plate member and tightening the plurality of securing fasteners disposed within the plurality of apertures defined within the support structure until the plurality of securing fasteners are substantially fully tightened so as to fixedly secure said first plate member upon the support structure;

partially untightening the plurality of securing fasteners with respect to the support structure such that the plurality of securing fasteners are again disposed in partially tightened states with respect to the support structure but remain disposed within the plurality of apertures defined within the support structure;

slidably moving said first plate member with respect to the shank portions of the plurality of securing fasteners, while maintaining the shank portions of the plurality of securing fasteners disposed within the plurality of apertures defined within the support structure, so as to remove said first plate member from the support structure as a result of the shank portions of the plurality of securing fasteners passing through and being disengaged from said apertures defined within said first plate member;

slidably mounting a second plate member, having a plurality of apertures formed therein, upon the support structure by relatively moving the shank portions of the securing fasteners through said apertures defined within said second plate member while the plurality of securing fasteners are still disposed within the apertures defined within the support structure; and re-tightening the plurality of securing fasteners with respect to the support structure to their substantially fully tightened states so as to fixedly secure said second plate member upon the support structure.

9. The method as set forth in claim 8, further comprising the step of:

forming said plate member as a die plate.

10. The method as set forth in claim 9, further comprising the steps of:

providing said die plate with a fluid material application surface for applying a fluid material onto the substrate; and providing channel means within said die plate for conducting the fluid material from a supply of fluid material toward said fluid material application surface.

11. The method as set forth in claim 8, further comprising the step of:

forming said plate member as a shim.

12. The method as set forth in claim 8, wherein said apertures defined within said plate member are formed by the steps of:

forming a plurality of through-bores within substantially central portions of said plate member along a longitudinal axis thereof; and forming a plurality of milled slots within said plate member such that said milled slots interconnect said plurality of through-bores with a free edge portion of said plate member.

13. The method as set forth in claim 12, further comprising the step of:

forming each one of said through-bores within said plate member with a counterbored portion for accommodating a head portion of each one of the plurality of securing fasteners when the plurality of fasteners are tightly engaged within the support structure.

14. The method as set forth in claim 13, further comprising the step of:

providing said through-bores of said plate member with substantially oval configurations such that said plate member can be adjustably positioned with respect to the plurality of shank portions of the plurality of securing fasteners in two degrees of freedom comprising lateral movements of said plate member in either one of two opposite directions.

* * * * *